Sept. 10, 1968   G. MENZEL ET AL   3,401,081
HYDRAULIC HOLDDOWN FOR NUCLEAR REACTOR FUEL ASSEMBLY
Filed April 28, 1966

Inventors
Gerhart Menzel
Charles E. Klotz
By Forest C. Sexton
Attorney

United States Patent Office 3,401,081
Patented Sept. 10, 1968

3,401,081
HYDRAULIC HOLDDOWN FOR NUCLEAR REACTOR FUEL ASSEMBLY
Gerhart Menzel, Simsbury, Conn., and Charles E. Klotz, West Allis, Wis., assignors to Allis-Chalmers Manufacturing Company, Milwaukee, Wis.
Filed Apr. 28, 1966, Ser. No. 546,082
3 Claims. (Cl. 176—50)

ABSTRACT OF THE DISCLOSURE

A nuclear reactor fuel assembly having a hydraulic holddown characteristic effected by an inlet nozzle at the lower end of said fuel assembly. The nozzle is provided with a plurality of inlet orifices perpendicular to the longitudinal axis of the fuel assembly to initially admit coolant perpendicular to the longitudinal axis of the fuel assembly. Coolant passageways then divert the incoming coolant upward parallel to the longitudinal axis of the fuel assembly. In the reactor, the fuel assembly is supported by a cup shaped support member which receives the nozzle. The cup shaped support member is provided with a plurality of openings which mate with the openings into the nozzle.

---

Figure 1:
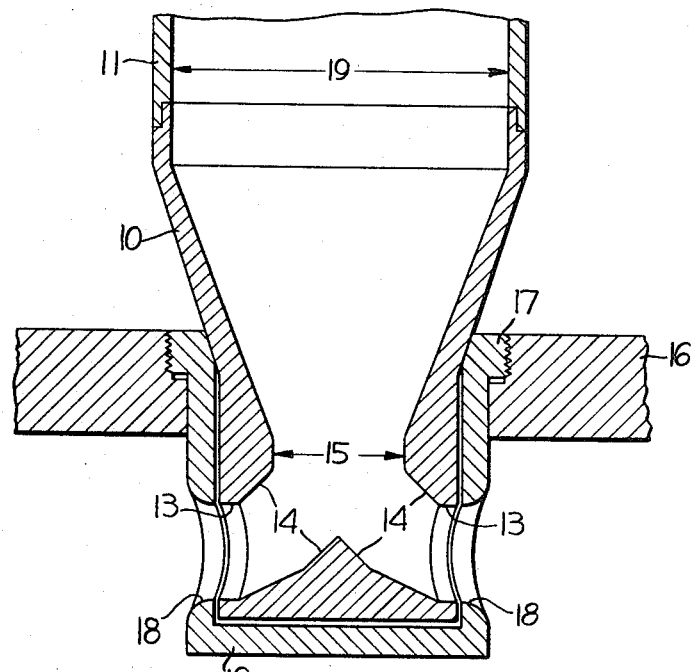

This invention relates generally to nuclear reactors. More specifically this invention relates to a new and improved fuel assembly inlet nozzle which eliminates the upward acting inlet momentum force of the reactor coolant to provide a hydraulic holddown action for reactor fuel assemblies.

In most nuclear power reactors, the reactor core comprises a plurality of vertically disposed fuel assemblies supported upon a grid plate. The lower end of each fuel assembly is provided with an inlet nozzle for admitting the fluid coolant into the fuel assembly. In operation, the coolant, heat exchange medium, is forced vertically upward through each fuel assembly where it serves to cool each discrete fuel pin or plate within the assembly. The coolant is in turn heated before it emerges at the top of the fuel assemblies. The heat energy in the coolant is subsequently converted into electrical energy through a steam turbine or some such prime mover.

For power producing purposes it is of course necessary to provide a sizable reactor and/or sizable power per unit volume so that a substantial quantity of coolant can be heated to a substantially elevated temperature. Accordingly, it then becomes necessary to provide a substantial coolant inlet pressure to effect the necessary coolant flow rate. The net result therefore, is that the individual fuel assemblies are subjected to a rather extensive hydraulic force which tends to lift them from the supporting grid plate.

Analyzing the hydraulic forces in more detail, it is noted that each fuel assembly is subjected to several forces, namely the upward acting inlet pressure force, $P_i$ and inlet momentum force $M_i$ and the downward acting outlet pressure force $P_o$, outlet momentum force $M_o$, and weight of the assembly, $W_a$. Because of the sizable flow rate through the fuel assemblies, there is a substantial pressure drop across the fuel assemblies resulting from friction and hydrostatic pressure differences. Thus, the inlet pressure force is usually substantially greater than the outlet pressure force. Therefore, if the upward acting inlet forces $P_i$ and $M_i$ are greater than the downward acting outlet forces $P_o$ and $M_o$ by a factor greater than the weight of the fuel assembly $W_a$, the fuel assemblies would tend to be lifted out of the supporting grid plate structure. That is to say, for any given fuel assembly, if $P_i+M_i$ is greater than $P_o+M_o+W_a$, then the assembly would be lifted from the grid plate by the resulting upward hydraulic action.

Because of such hydraulic actions, it has usually been necessary in power reactor designs to provide a fuel assembly holddown mechanism which either clamps the fuel assemblies in position or weights them down from above. However, neither of these solutions is especially satisfactory because they add to the total cost of the reactor, complicate its structure and operation, and in some cases such structures may restrict or interfere with coolant flow, to create an even greater pressure drop across the reactor fuel assemblies.

More recently, some power reactor design studies have developed fuel assembly designs which provide a hydraulic holddown. That is, by a properly designed fuel assembly inlet nozzle the upward acting inlet forces have been substantially reduced in relation to the downward acting outlet forces. For example, coolant inlet nozzles have been designed to take advantage of venturi effects whereby the coolant is admitted into the fuel assembly through a vertical orifice of a given limited cross sectional area. Then within the fuel assembly, the cross sectional area of the coolant passage is gradually increased, so that the outlet cross sectional area is greater than the inlet orifice cross sectional area. This practice will substantially reduce the upward acting inlet pressure force in relation to the downward acting outlet pressure force. However, in addition to reducing the relative inlet pressure force, the venturi design will cause an increase in the upward acting inlet momentum force which in some cases may be an even greater upward acting force than the effected increase in relative downward acting pressure forces. Despite this fact, some advantage can usually be obtained by venturi designs because if the inlet and outlet cross sectional areas are carefully selected for a given rate of flow, the reduction in inlet pressure force can be made greater than the increase in inlet momentum force, to thus provide a net decrease in upward acting forces. In a typical situation for example, as the ratio of outlet cross sectional area to inlet cross sectional area is increased slightly from 1:1, the relative inlet pressure force is greatly reduced while the inlet momentum force is only slightly increased. As the ratio is made progressively greater, however, the reduction in inlet pressure force is less severe while the increase in inlet momentum force becomes more pronounced until at some given ratio, depending upon other design characteristics, the increase in inlet momentum force is greater than the decrease inlet pressure force. Therefore, the advantages to be obtained by a venturi design above are somewhat limited.

This invention is predicated upon the development of a new and improved fuel assembly inlet nozzle and supporting structure which completely eliminates the upward acting inlet momentum force by providing coolant inlet orifices perpendicular to the longitudinal axis of the fuel assembly. Thus, any inlet momentum forces will act perpendicular to the longitudinal axis of the fuel element, so that such a momentum force cannot act to lift the fuel element from the grid plate structure. Furthermore, if the inlet nozzle of this invention (which completely eliminates the upward acting inlet momentum force) is utilized in combination with the venturi type nozzle described above (which greatly reduces the upward acting inlet pressure force), any rate of coolant flow within the reactor may be maintained without the need for mechanical fuel assembly holddown devices.

Accordingly, it is a primary object of this invention to provide an inlet nozzle for a nuclear reactor fuel assembly which incorporates coolant inlets perpendicular to the longitudinal axis of the fuel assembly to effect a complete elimination of the upward acting inlet momentum force.

It is another primary object of this invention to provide an inlet nozzle for a nuclear reactor fuel assembly which eliminates the upward acting inlet momentum force resulting from coolant flow thereinto.

It is yet another primary object of this invention to provide a new and improved inlet nozzle for a nuclear reactor fuel assembly which incorporates a hydraulic holddown design.

It is still another primary object of this invention to provide an inlet nozzle for a nuclear reactor fuel assembly which greatly reduces the upward acting inlet hydraulic forces so that mechanical holddown devices are not needed.

It is a further primary object of this invention to provide a fuel assembly for a nuclear reactor which effects greater downward acting hydraulic forces than it does upward acting hydraulic forces so that mechanical holddown devices are not needed.

Figure 2:
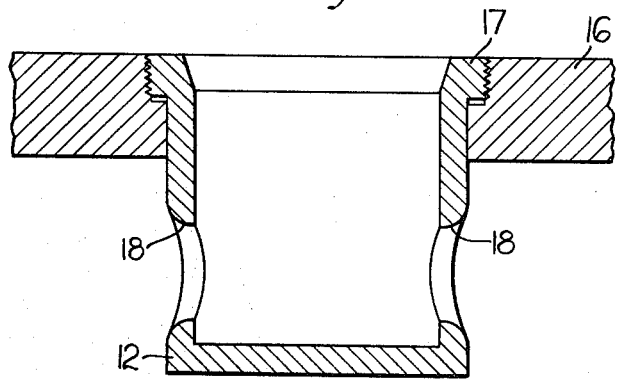

These and other objects and advantages are fulfilled by this invention as will become apparent from a full understanding of the following detailed description especially when considered in conjunction with the accompanying drawings of which:

FIG. 1 is a cross sectional side view of one embodiment of this invention showing the fuel assembly inlet nozzle in position and surrounding structure; and FIG. 2 is a cross sectional side view of the nozzle receiving cup with the fuel element and nozzle post withdrawn.

Referring now to the drawing, one embodiment of this invention, as shown in FIG. 1, comprises a fuel assembly inlet nozzle post 10 secured to the lower end of a fuel assembly 11, being supported within the reactor by a cup shaped support member 12 (receiving cup). The fuel assembly 11 will of course house the nuclear fuel (not shown) and provide vertical channels for coolant flow adjacent to said nuclear fuel. The methods by which the nuclear fuels are incorporated into the fuel assembly are well known in the art and need not be discussed here.

The inlet nozzle post 10 is provided with two or more diametrically opposed orifices or openings 13 which at the outer surface of the nozzle post 10 are perpendicular to the longitudinal or vertical axis of the fuel assembly 11. From the orifices 13, two coolant passageways 14 extend into nozzle post 10 curving upward to convey coolant into the fuel assembly 11 through the vertical orifice 15. Preferably, the cross sectional areas of the two orifices 13 with associated passageways 14 should not be greater than the cross sectional area of orifice 15.

As shown in FIG. 2, the receiving cup 12 is removably secured to the reactor grid plate 16 by the threaded flange 17. The cup 12 is provided with two or more diametrically opposed openings 18 in the side of said cup 12 which will mate with orifices 13 when the fuel assembly inlet nozzle post 19 is in position. The edges of said openings 18 should be beveled and relieved as shown to minimize coolant flow restrictions and turbulence.

Because the velocity of coolant through the openings 18, orifices 13 and 15, and passageways 14, will be rather substantial, the exposed surfaces therein should be excessively hard so as to withstand the erosive action of the coolant flowing therethrough. This of course, can be accomplished by fabricating the nozzle post 10 and receiving cup 12 from a hard alloy, or by surface hardening a softer alloy.

In order to minimize the inlet pressure forces the vertical orifice 15 should be smaller in cross sectional in relation to the fuel assembly outlet 19 as shown in FIG. 1. Thus, the inlet nozzle as shown also incorporates a venturi design as discussed previously.

In operation, the coolant is admitted into the reactor at the chamber immediately below the grid plate 16. The driving force behind the coolant then forces the coolant through openings 18 and orifices 13. The passageways 14 then direct the coolant upward through the vertical orifice 15 into the fuel assembly 11. Because the coolant is admitted through openings perpendicular to the longitudinal axis of the fuel assembly 11, there is no upward acting inlet momentum force as in the case of openings parallel to the axis of the fuel assembly. Rather the inlet momentum forces at each of the two openings act perpendicular to the axis of the fuel assembly 11. If the two orifices 13 are diametrically opposed as shown, the perpendicular momentum force at one opening in the incoming direction is canceled by the equal opposing momentum force at the other opening.

Accordingly, the only upward acting force would be the inlet pressure force. If this inlet pressure force is less than the combined downward forces, namely the outlet pressure force, the outlet momentum force and the weight of the fuel assembly, then there will be no resultant lifting action on the fuel assembly. If a venturi design is further incorporated the inlet nozzle as shown whereby the vertical orifice 15 is smaller than the fuel assembly outlet 19, then the downward acting outlet pressure force can be made to exceed the upward acting inlet pressure force despite pressure losses across the fuel assembly 14. Thus a proper design will assure that mechanical holddown device will not be needed no matter what the flow rate.

It should be obvious from the above description that many different embodiments and modifications could be made without departing from the spirit of this invention. For example, the inlet openings as openings 18, and orifices 13 need not be limited to two, and need not necessarily be diametrically opposed to eliminate perpendicular inlet momentum forces. Certainly resultant momentum forces normal to the axis of the fuel assembly could be tolerated if not too severe. Another obvious modification would be to secure the receiving cup 12 to the grid plate 16 by some means other than a threaded flange as shown in the drawings. However, the removable feature of the receiving cups would be desirable since the cups could be replaced or repaired without severe complications. Further developments could make it possible to eliminate the receiving cup 12 altogether with only the inlet nozzle protruding below the grid plate 16.

Therefore, the design of the inlet nozzle and cup will be specific to each set of reactor flow and pressure drop characteristics. Accordingly, it will be desirable to optimize between maximum holddown forces and minimum pressure drop for each case considered. Therefore, this invention should not be limited to the details given herein, but may be modified within the scope of the appended claims.

The embodiments of the invention in which an exclusive property or privilege is claimed are defined as follows:

1. A nuclear reactor fuel assembly of the type having a passageway therethrough for the vertically upward movement of a liquid coolant, and having an inlet nozzle at the lower end thereof for admitting the coolant, said nozzle comprising a nozzle post rigidly secured to said fuel assembly; said nozzle post having a plurality of inlet orifices in the outer surface thereof extending inward perpendicular to the longitudinal axis of the fuel assembly to initially receive coolant moving in a direction perpendicular to the longitudinal axis of the fuel assembly, and a coolant passageway extending upward from each inlet orifice to direct the coolant upward parallel to the longitudinal axis of the fuel assembly; and a cup shaped support member to receive the lower portion of support member having a plurality of openings therethrough which mate with the inlet orifices in the nozzle post.

2. A nuclear reactor fuel assembly according to claim 1 wherein said coolant passageways curve upward to jointly form an outlet orifice in the upper portion of the nozzle.

3. A nuclear reactor fuel assembly according to claim 2 wherein said outlet orifice has a cross sectional area no smaller than the combined cross sectional of all inlet orifices.

References Cited

UNITED STATES PATENTS

| | | | |
|---|---|---|---|
| 3,158,543 | 11/1964 | Sherman et al. | 176—50 X |
| 3,175,954 | 3/1965 | Potter | 176—61 |
| 3,192,120 | 6/1965 | Campbell | 176—50 |
| 3,201,319 | 8/1965 | Hackney et al. | 176—61 X |
| 3,205,144 | 9/1965 | Jabsen | 176—30 X |
| 3,235,465 | 2/1966 | McDaniel et al. | 176—61 |
| 3,252,869 | 5/1966 | Koutz | 176—83 X |

BENJAMIN R. PADGETT, *Primary Examiner.*

M. J. SCOLNICK, *Assistant Examiner.*